US012522032B2

(12) United States Patent
Abry et al.

(10) Patent No.: US 12,522,032 B2
(45) Date of Patent: *Jan. 13, 2026

(54) ANTI-SKID DEVICE

(71) Applicant: AFFIN AS, Oslo (NO)

(72) Inventors: Christian Abry, Eiksmarka (NO); Emil Abry, Hosle (NO); Crostopher John Kavanagh, Oslo (NO); Harald Furu, Oslo (NO)

(73) Assignee: AFFIN AS, Oslo (NO)

( * ) Notice: Subject to any disclaimer, the term of this patent is extended or adjusted under 35 U.S.C. 154(b) by 794 days.

This patent is subject to a terminal disclaimer.

(21) Appl. No.: 17/770,080

(22) PCT Filed: Oct. 14, 2020

(86) PCT No.: PCT/NO2020/050250

§ 371 (c)(1),
(2) Date: Apr. 19, 2022

(87) PCT Pub. No.: WO2021/080435

PCT Pub. Date: Apr. 29, 2021

(65) Prior Publication Data

US 2022/0410643 A1 Dec. 29, 2022

(30) Foreign Application Priority Data

Oct. 22, 2019 (NO) .................................. 20191262

(51) Int. Cl.
*B60C 27/02* (2006.01)
*B60C 27/04* (2006.01)
(52) U.S. Cl.
CPC ........ *B60C 27/023* (2013.01); *B60C 27/0246* (2013.01); *B60C 27/0261* (2013.01); *B60C 27/04* (2013.01)

(58) Field of Classification Search
CPC .............. B60C 27/023; B60C 27/0238; B60C 27/0246; B60C 27/04
See application file for complete search history.

(56) References Cited

U.S. PATENT DOCUMENTS 2,454,005 A   11/1948 Pletch
2,575,263 A   11/1951 Eisenhauer
(Continued)

FOREIGN PATENT DOCUMENTS

CN   209757048   12/2019
CN   209904464   1/2020
(Continued)

OTHER PUBLICATIONS

Written Opinion Issued in PCT/NO2022/050088, Jul. 6, 2022, pp. 1-6.

(Continued)

*Primary Examiner* — Jason R Bellinger
(74) *Attorney, Agent, or Firm* — Jeffrey S. Melcher; Melcher Patent Law PLLC

(57) ABSTRACT

This present invention relates to an anti-skid device adapted to being mounted on tyres of the vehicle wheels to provide traction and wheel to ground contact enhancement in snowy and icy conditions. The device includes a central hub from which protrudes radially three arms which are extended at the outer end by anti-slip components transversally embracing the tread of the tyre. The inner area of the anti-slip components in contact with the tread is designed to increase friction to prevent circumferential displacement of the anti-skid device. When the car is moving a horizontal depression is formed at tyre-ground contact and this provokes a change in wheel radius. Integrated springs follows the depression by moving radially inwards to ensure that the anti-skid device stays attached to the tyre even when an anti-slip component is at the ground contact point at the bottom of wheel. A (Continued)

fastening handle integrated into the hub secures the device on the wheel by simultaneously tightening the arms radially inwards.

11 Claims, 5 Drawing Sheets

(56) References Cited

U.S. PATENT DOCUMENTS

| | | | |
|---|---|---|---|
| 2,873,783 | A | 2/1959 | Higgins |
| 4,192,367 | A * | 3/1980 | Chabot .................. B60C 27/04 152/225 C |
| 4,209,049 | A | 6/1980 | Regensburger |
| 4,405,006 | A | 9/1983 | Preusker |
| 4,735,248 | A | 4/1988 | Cizaire |
| 4,834,158 | A | 5/1989 | Katz |
| 6,053,227 | A | 4/2000 | Robeson |
| 6,983,778 | B1 | 1/2006 | Pitts |
| 7,426,949 | B2 * | 9/2008 | Chaisson, Jr. .......... B60C 27/04 152/218 |
| 9,487,056 | B1 * | 11/2016 | Dolios ................ B60C 27/0269 |
| 10,328,757 | B1 | 6/2019 | Goodson |
| 10,807,423 | B2 | 10/2020 | Morgese |
| 11,938,763 | B2 * | 3/2024 | Furu ....................... B60C 27/20 |
| D1,033,290 | S | 7/2024 | Furu |
| 12,109,854 | B2 | 10/2024 | Rodriguez |
| 2011/0094643 | A1 | 4/2011 | Reil |
| 2022/0410643 | A1 | 12/2022 | Furu |

FOREIGN PATENT DOCUMENTS

| | | |
|---|---|---|
| DE | 20 2004 004 887 | 10/2004 |
| EP | 0030521 | 6/1981 |
| EP | 0110838 | 6/1984 |
| EP | 2050590 | 10/2007 |
| FR | 2620672 | 3/1989 |
| GB | 2272193 | 5/1994 |
| KR | 20040091223 | 10/2004 |
| NO | 20191262 | 1/2021 |
| WO | 2018/145673 | 8/2018 |
| WO | 2021/080435 | 4/2021 |
| WO | 2022/225401 | 10/2022 |
| WO | 2023/219512 | 11/2023 |

OTHER PUBLICATIONS

International Search Report Issued in PCT/NO2023/050086, Jul. 10, 2023, pp. 1-2.

Written Opinion Issued in PCT/NO2023/050086, Jul. 10, 2023, pp. 1-6.

International Search Report Issued in PCT/NO2020/050250, Apr. 12, 2020, pp. 1-3.

Written Opinion Issued in PCT/NO2020/050250, Apr. 12, 2020, pp. 1-6.

Applicant's response to Written Opinion Issued in PCT/NO2020/050250, Apr. 29, 2021 pp. 1-3.

* cited by examiner

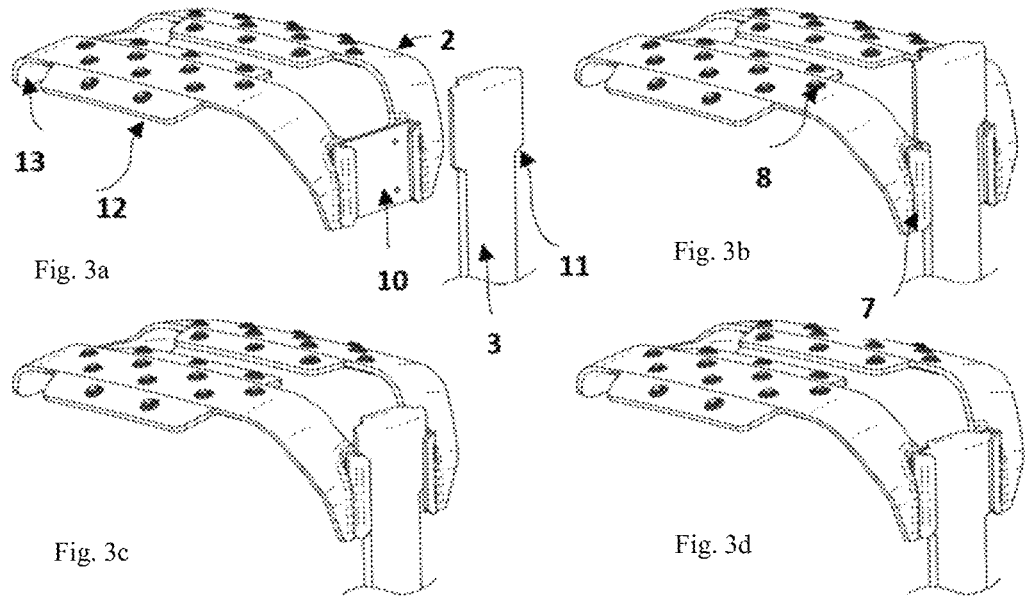
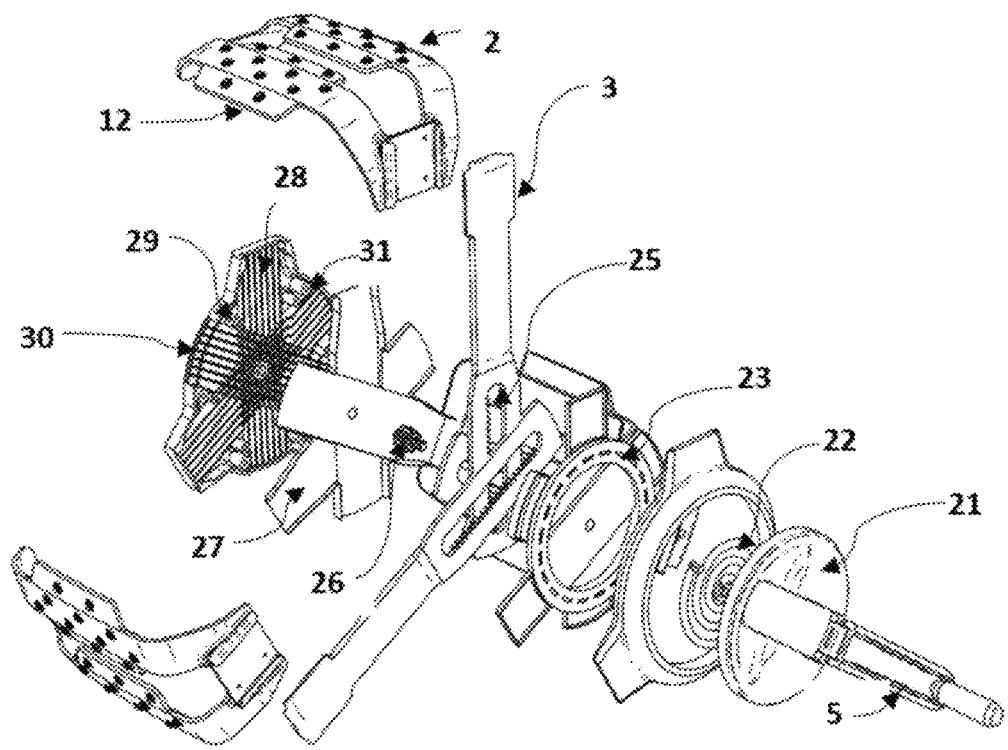

ANTI-SKID DEVICE

BACKGROUND OF THE INVENTION

Field of the Invention

This invention relates generally to an anti-skid device for use in connection with vehicle wheels to improve traction in snow and ice. In particular, it relates to an anti-skid device that may be easily and quickly mounted and removed, easily and securely fastened and may be adjusted to different wheel sizes.

Description and Drawbacks of Prior Art

A variety of anti-skid devices are available for mounting on vehicle tires to enhance friction under extreme snow and ice conditions. Snow chains have been the standard for many years, though effective, they suffer from several disadvantages. Some of the disadvantages with such chains is that they are heavy, cumbersome, noisy in contact with bare pavement or with the inside of the fenders and require jacking-up the car to mount on wheels. A motorist faced with all these difficulties tends to leave the chains mounted even in ice and snow-free roads and this results in an accelerated rate of wear of the chains. In addition, these kinds of devices take up valuable space when not in use. To overcome the limitations of traditional snow chains, other types of anti-skid devices have been invented, these are devices composed of a plurality of arms radiating from a central housing, each arm is linked to a hook-like anti-slip component which extends transversally over the tread of the tire.

U.S. Pat. No. 5,735,980 to Robeson teaches an emergency traction device which may be easily and securely fitted on vehicles having tires of different diameters and widths. A first winch sizes and secures the traction device for the proper tire diameter and a second winch sizes and secures the traction device for the proper tire width.

Further examples of such devices are described in the following patents: (1) EP2050590B1, (2) U.S. Pat. No. 4,209,049A, (3) U.S. Pat. No. 4,834,158A, (4) U.S. Pat. No. 2,873,783A, (5) U.S. Pat. No. 4,735,248A. Although these anti-skid devices fulfil their intended purposes, they suffer from several shortcomings, they are complex, cumbersome, made of many parts, expensive to manufacture, difficult to place upon the wheel, heavy, and take up space when not in use. In general, they lack simplicity. It is therefore an object of the present invention to overcome many of the disadvantages of the prior art and to present to the market an anti-skid device that is simple, effective and efficient, compact, lightweight and cheap to manufacture.

SUMMARY OF THE INVENTION

The primary object of this invention is to provide an anti-skid device which is easy to mount and dismount from the wheel without the need of skills, physical strength or a separate tool.

Another object of the invention is to provide an anti-skid device which is simple, compact and made of few parts.

Another object of this invention is to provide an anti-skid device which can be mounted from the front face of the wheel and can be adapted to different wheel sizes.

Another object of this invention is to provide an anti-skid device which remains fastened even if the wheel changes diameter due to the flattening of the tire at the wheel-ground contact.

BRIEF DESCRIPTION OF THE DRAWINGS

FIGS. 3a, 3b, 3c and 3d are perspective views and steps to follow in order to connect an anti-slip component to one end of an arm.

FIG. 4 is an exploded view of the entire device.

DETAILED DESCRIPTION OF THE DRAWINGS

Figure 1:
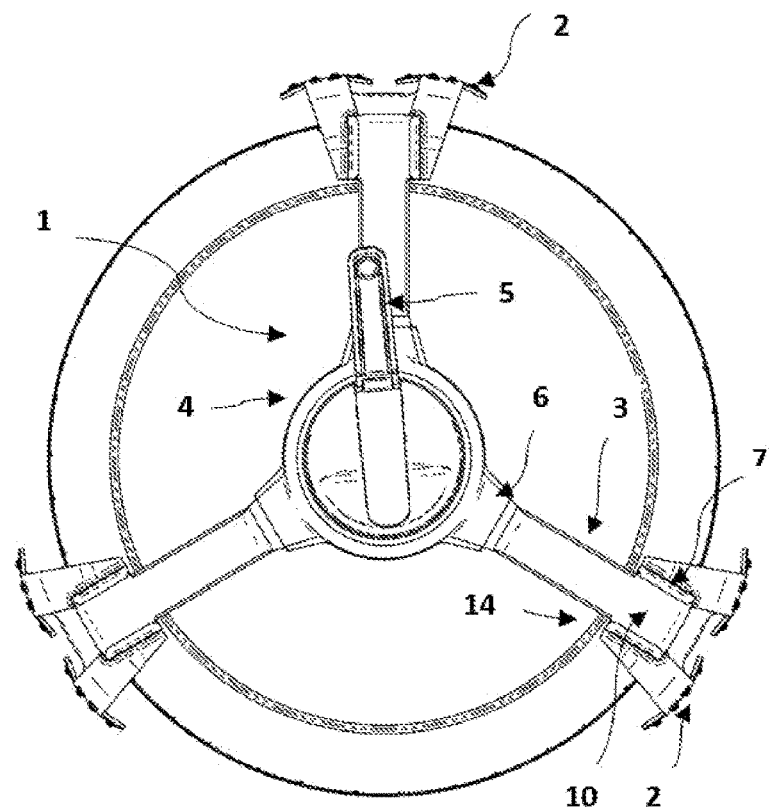
FIG. 1 is a perspective view of the anti-skid device being mounted on the wheel.
Figure 2:
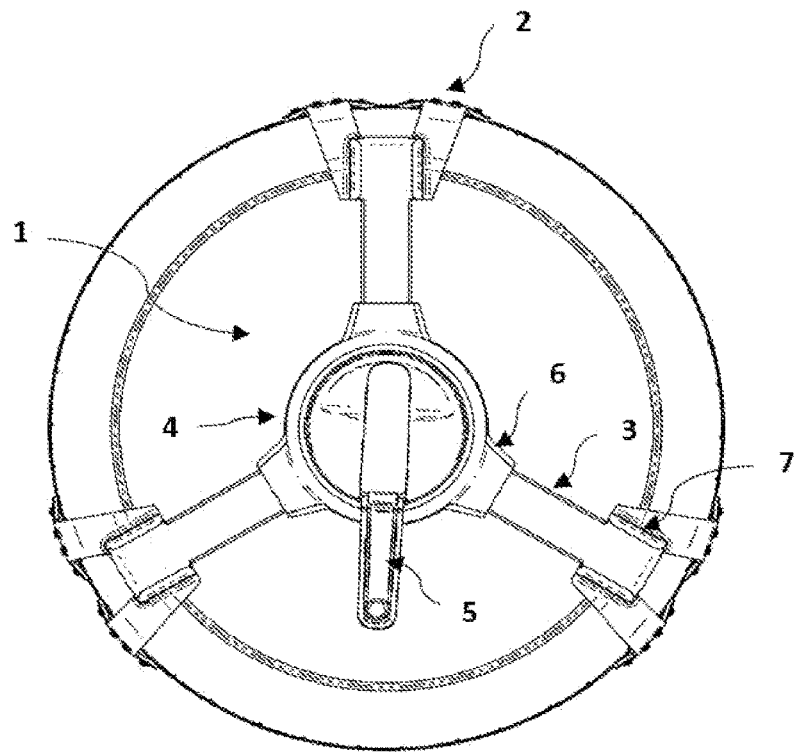
FIG. 2 is a perspective view of the anti-skid device after it has been mounted on the wheel.

The springs or spring elements (22, 34, 50, 51) used in the anti-skid device (1) may be composed of different materials including metals or polymers. Referring to the drawings in detail, FIGS. 1 and 2 show an anti-skid device 1 according to the invention. As shown the device 1 consists of three arms 3. Although three arms are shown in the drawings it should be understood that there may be four or more arms. At the outer end of each arm 3 is an attachment point 7 to which anti-slip elements 2 are removably fastened by sleeve 10. The relationship between mount 7 and sleeve 10 allows the anti-slip elements 2 freedom to move in a single linear axis such that they may slide inwards (towards the center of the wheel 14), but may not slide outwards beyond a fixed limit. A great advantage with this construction is that it allows the device to be fitted to a range of wheel diameters by adjusting the lengths of the arms 3. At their inner ends the arms 3 are held slidably by a hub 4 comprising a housing 6, backplate 30 and guides 27, 28. Handle 5 is part of the operating means used to operate the inwards or outwards movement of the arms 3 to facilitate device 1 being mounted onto a wheel 14. This will be described in more detail with reference to FIG. 4 and FIGS. 7-9. FIG. 1 shows the device 1 with arms 3 fully extended prior to being mounted on the wheel 14 while FIG. 2 shows the device 1 fastened to the wheel 14.

The handle 5 may be foldable/retractable and/or detachable from the device 1 when not in use.

In FIGS. 3a, 3b, 3c and 3d there is shown the anti-slip element 2. Each element 2 has a sleeve 10 that is connected to the outer end of the arm 3. Each anti-slip element 2 is composed of two identical and symmetrical parts with a gap between allowing in this way a greater coverage of the tire with an anti-slip surface. Sleeve 10 slidably receives the attachment point 7 of the arm 3. In this preferred embodiment, attachment point 7 is wider than the majority of arm 3 and equipped with a flange 11 at its extremity. As can be seen in FIG. 3b, sleeve 10 assembles to arm 3 below attachment point 7, before sliding outwards until it is stopped by flange 11. Thus sleeve 10 and anti-slip element 2 are free to slide inwards but may not slide outwards due to the limiting effect of flange 11. It is also possible to create sleeve 10 with a partially closed end, such that it is this partially closed end that limits the outward movement of sleeve 10 in relation to arm 3. In this case flange 11 would not be required. This limited sliding interaction between anti-slip element 2 and arm 3 is important, in that it ensures that the upwards radial force created as the car drives over anti-slip element 2 is not transferred to arm 3 and thus to housing 6. Thus the anti-slip element 2 is free to follow the depression of the tire created as the car drives over anti-slip element 2 and will return outwards to the limit of its travel once the weight of the car is removed from anti-slip element 2 and the tire retakes its original form once more.

Each anti-slip element 2 is equipped with multiple raised grip details 8 irregularly spaced, both, in the inner and the outer surfaces to increase friction with the ground, and to prevent any circumferential movement of the anti-slip components along the tire tread. In this preferred embodiment, grip details 8 take the form of protuberances, but may also take the form of holes or local areas formed from a high friction material. Circumferential movement prevention is further enforced by the curved shape 12 of the left and right parts of the anti-slip element 2. An additional benefit of the curved shape 12 is observed under braking conditions, where curved shape 12 will mechanically engage with the deformable rubber of the tire, thus not relying solely upon the friction created by grip details 8. This is important in that it reduces the forces exerted upon arms 3 and housing 6 during braking. Undesired outwards movement of the anti-slip element 2 relative to the tire is prevented by shoulder 13, cupping the inside wall of the tire and preventing the device 1 from loosening from the tire. This is particularly relevant in the case where a wheel 14 spinning at higher speed while turning the car to the left or right may exert a combination of centrifugal and axial outwards forces on the device 1, requiring an extremely secure fastening of device 1 to the tire. In alternate embodiments, shoulder 13 may be replaced by one or more hook details, or a hinged flange detail able to be locked in a downwards position thus preventing outwards movement of anti-slip element 2. Anti-slip element 2 could also be formed in other ways, for example as by a thick wire element shaped to perform the same task without deviating from the spirit of the invention.

FIG. 4 shows an exploded 3D view of the device 1. At its inner end the device has a backplate 30 that rests against a wheel hub when in use. On the front side 29 of the backplate 30 are U-shaped guides 28 that receive the arms 3 and allow them to slide in a guided manner (i.e. linearly) when extended or retracted. Optional guides 27 are also shown and may be included for adding strength. Further outwards are shown the arms 3. Their design and function will be described in more detail with FIGS. 7-9. Further there is a ring 23 that interacts with a locking detail in the rear of cover 21, used to lock the rotation of handle 5 and cover 21 and thus set the extension of arms 3. In this embodiment, handle 5 is hingeably connected to cover 21 such that they rotate together. The housing 6 is fastened to the backplate 30 with screws mounted through multiple holes 31. The arms will thus be held in place while still being allowed to move linearly in the guides 28 (27).

The ring 23 is equipped with multiple holes 32 intended to engage with one or more locking teeth on the rear side of cover 21 (not visible in the exploded view). The teeth might be formed like a shark's fin and may be hinged and sprung such that they engage with the holes. Cover 21 pivots freely around the central axis of gear 26. Cover 21 is attached to spring 22 which is in turn attached to gear 26. The spring element 22 allows the user to introduce tension to the system. When the user rotates handle 5, cover 21 rotates around the central axis of gear 26, tightening spring 22 and in turn rotating gear 26. Rotation of gear 26 clockwise causes arms 3 to retract inwards, tightening anti-slip elements 2 around the tire. When anti-slip elements 2 are sitting tightly around the tire, due to the spring 22, the user can turn handle cover 21 slightly further, for example 20 degrees rotation, before locking the rotation of handle cover 21. Thus, the anti-slip elements 2 are pretensioned inwards due to the compressed nature of spring 22. This is advantageous in the case where the tire is temporarily deformed inwards, for example if the car drives over a stone. Here the tire will depress inwards, and due to the pre-tensioning of arm 3 and anti-slip element 2 by spring 22, anti-slip element 2 will follow the movement of the tire inwards, thus following the depression and maintaining a consistent fit with the tire. This consistent fit prevents shoulder 13 of anti-slip element 2 that rests on the inside of the wheel 14 from losing its grip, thus ensuring device 1 remains fastened securely on the wheel 14. It is a further advantage of the preferred embodiment that the use of three arms allows the device to be more easily attached to a wheel 14 than say five arms. This is due to the fact that by attaching to the wheel 14 with a single anti-slip element 2 positioned at the top of the tire, the two lower arms 3 and anti-slip elements have clearance both to the metal body of the car surrounding the wheel 14, and to the wheel 14 itself. A device equipped with 4 or 5 arms is more difficult to assemble to the wheel 14 due to having to pass through the gap between wheel 14 and car body while in extended position.

Equipping the device 1 with three arms 3 has the additional advantage in that in the event that the slidable connection between arm 3 and anti-slip element 2 becomes locked, for example a stone or grit lodges in the mechanism, that the resulting upwards displacement of the device 1 will not loosen an anti-slip plate positioned diametrically opposite the anti-slip plate being driven over.

Figure 5:
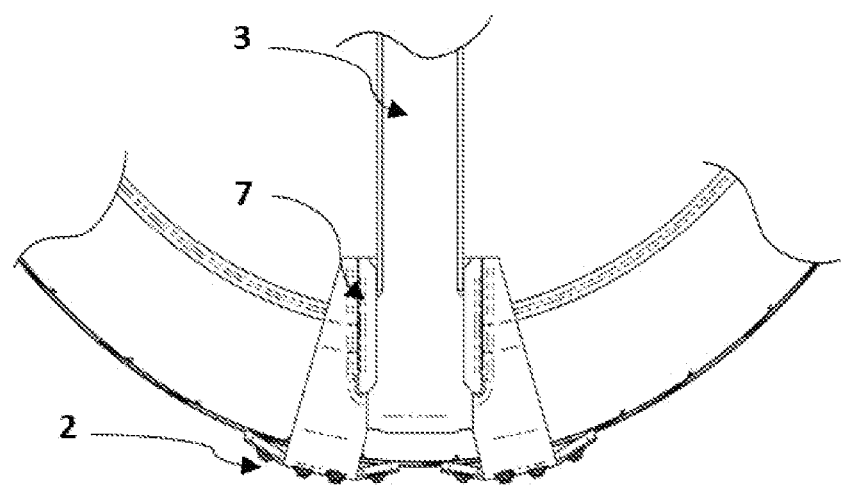
FIG. 5 is a perspective view of the compressive joint with an arm connected to an anti-slip component through a vertical sliding connection. The view shows a compressed position.
Figure 6:
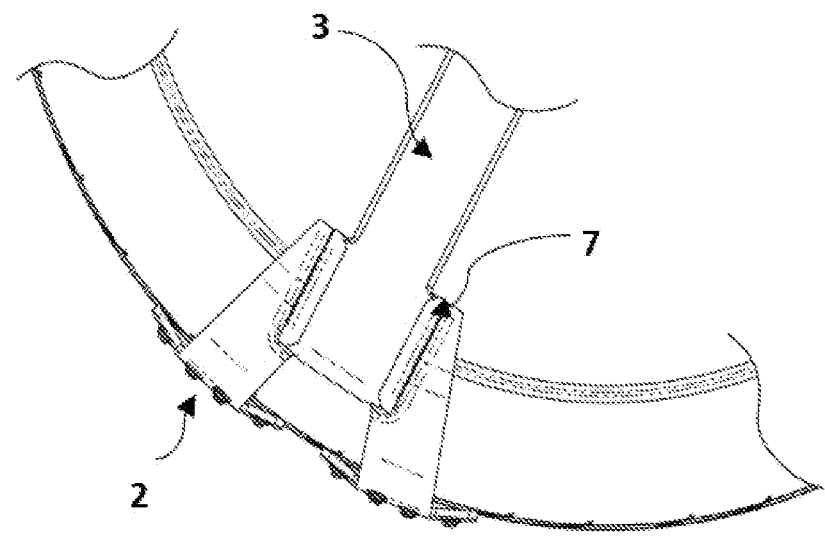
FIG. 6 is a perspective view of the compressive joint with an arm connected to an anti-slip component through a vertical sliding connection. The view shows a normal position.

FIG. 5 illustrates the point where the weight of the car compresses the tire and shows anti-slip element 2 and sleeve 10 translated upwards relative to arm 3, thus ensuring that force is not transferred to arm 3. FIG. 6 illustrates the tire having rotated further, and having resumed its former shape, with anti-slip element 2 returning to its original position.

As mentioned earlier, handle 5 is hingeably connected to cover 21, such that it has a retracted position resting in a recess, and a folded outwards or usage position as shown in FIG. 4. Handle 5 is arranged such that when the user pushes outward on handle 5 (whilst in its usage position), the teeth disengage, allowing cover 21 to rotate relative to part 23 and the rest of the device. When the user has tightened/loosened the system as desired, they release pressure on the handle 5, and the sprung teeth will engage with the holes 32. Folding handle 5 in gives an extra degree of security, locking the teeth in place. An alternate locking mechanism could be a handle with a pin engaging a series of holes or holes in a plate as shown in FIG. 9.

Figure 7:
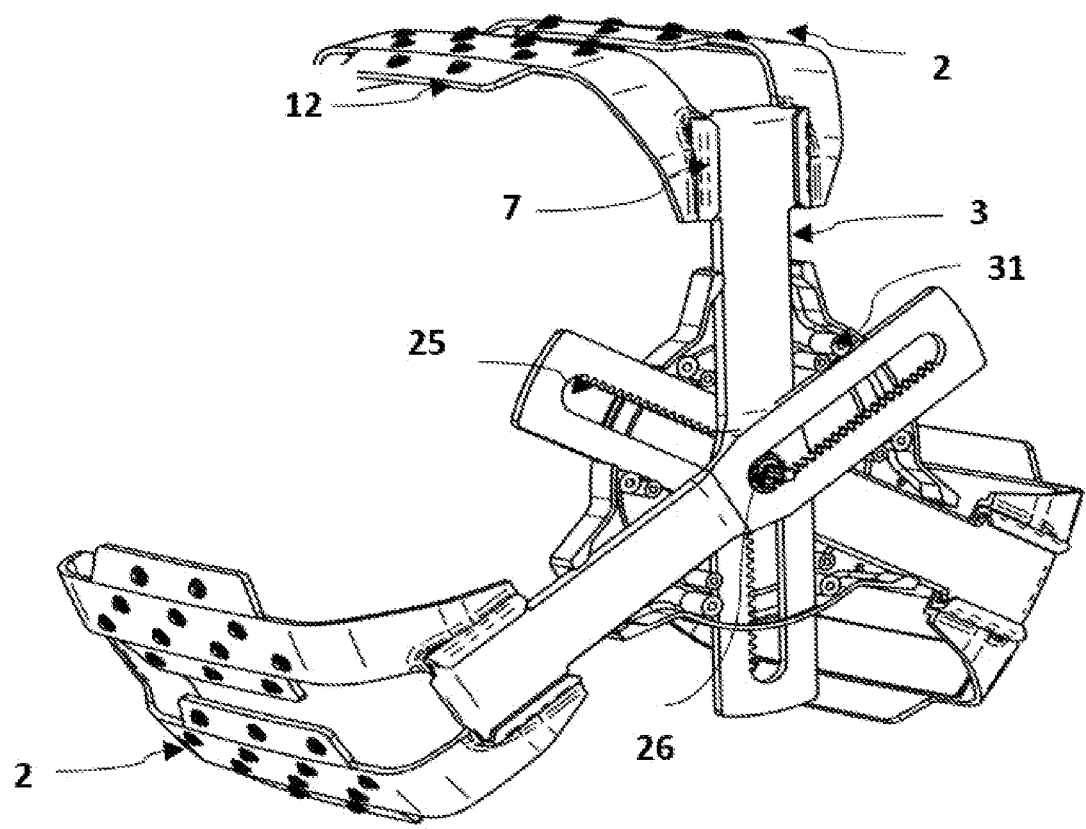
FIG. 7 shows the device at its minimum arms extension, with outer components removed for clarity.

In FIG. 7 the arms are shown in more detail. Each arm 3 has an elongated hole 25. A series of rack teeth 33 are cut along one long side of the hole 25. The pinion 26 is driven by the rotation of handle 5, in this case connected by spring 22. In this preferred embodiment there is one pinion 26 long enough to engage the rack teeth 33 in all the arms 3. The turning of the handle 5 will cause the assembly to rotate and the pinion 26 will then engage with the teeth to extend or retract the arms 3. Optionally there may be three pinions 26, one for the rack teeth in each arm.

Figure 8:
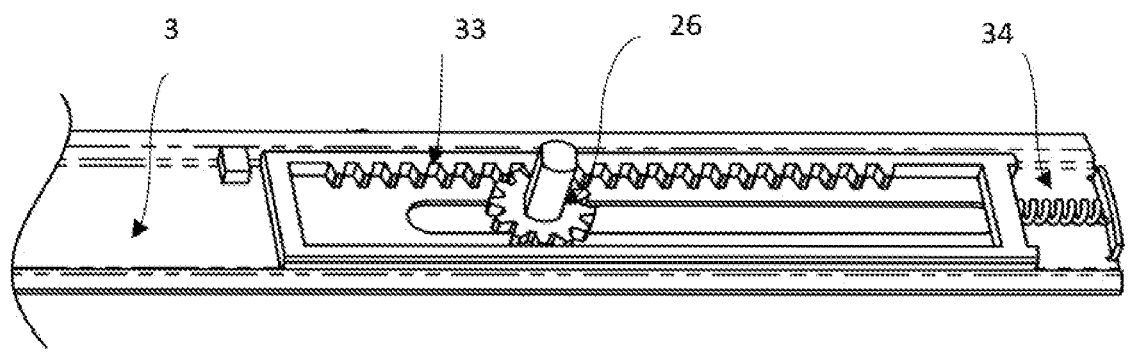
FIG. 8 is a view of an alternate embodiment of a mechanism allowing the arms to be extended and tensioned.

In FIG. 8 there is shown such an alternative embodiment for keeping the anti-slip element 2 in contact with the tire. In this embodiment, arm 3 is formed as a hollow tube, wherein the rack 33 is a slideable element positioned inside arm 3. In FIG. 8 the outer surface of arm 3 is removed such that the inner mechanism is visible. Now spring 34 is arranged to bias the arm to its retracted position. When the arms are extended the spring 34 will exert a force that seeks to retract the arms 3 and thus hold the anti-slip element 2 in a tight position against the tire. Such an embodiment can be advantageous in that springs are internalised and do not increase the thickness of device 1. One or several springs 34 may be used if greater spring force is required than that provided by a single spring 34. A further variant of device 1 which utilizes the internal spring mechanism described here may be envisaged wherein anti-slip elements 2 are permanently affixed to arms 3 with no sliding relationship between them at attachment point 7. Instead, in this embodiment, the inwards compression resulting from the wheel 14 driving over the anti-slip element 2 would be allowed for by the relative movement of rack 33 to arm 3. This has the advantage of simplifying the attachment of anti-slip components 2 to arms 3, but the disadvantages of a greater space requirement when stored and that the arms 3 will slide relative to each other within housing 6, which may result in more wear to these components.

Figure 9:
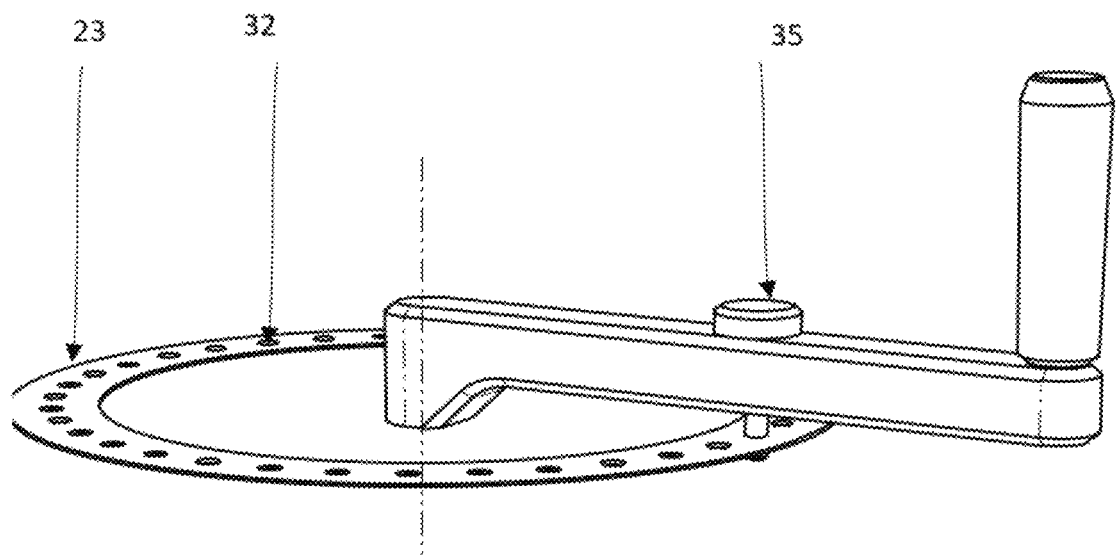
FIG. 9 shows a locking means comprising a plate with holes and a handle with pins for engaging the holes of the plate.

FIG. 9 shows an embodiment of handle 5 and locking ring 23 alone for ease of understanding. As in the first embodiment described, ring 23 is penetrated with a plurality of holes 32. A pin 35 is used to lock the rotation of handle 5 relative to ring 23, whereby pin 35 connects removably with the nearest hole 32 to the desired locking position.

As a further alternative embodiment of the operating means, it may be envisaged that the arms 3 slide linearly as described earlier, but are self-tightening with for example a one direction ratchet mechanism. In such an embodiment a handle 5 would not be necessary, and instead a release mechanism would be activated to allow the arms 3 to move outwards for removal from the wheel 14.

When not in use the device is stored in the boot of the car. When it is needed the device will be placed beside the wheel 14 and the handle first turned anti clockwise to extend the arms 3 outwards such that the device can be mounted onto the wheel 14. When in place around the tire the handle 5 will be turned in the clockwise direction to retract the arms 3 until the anti-slip elements 2 fit tightly around the rim of the wheel 14. The same procedure is used to mount a second device on the other driving wheel 14. While it is not foreseen that it should be necessary to use the device on all four wheels of a 4 wheel drive car, it may at times be necessary since some 4-wheel drive cars will adjust the power to the driving axle that has the least resistance.

Figure 10:
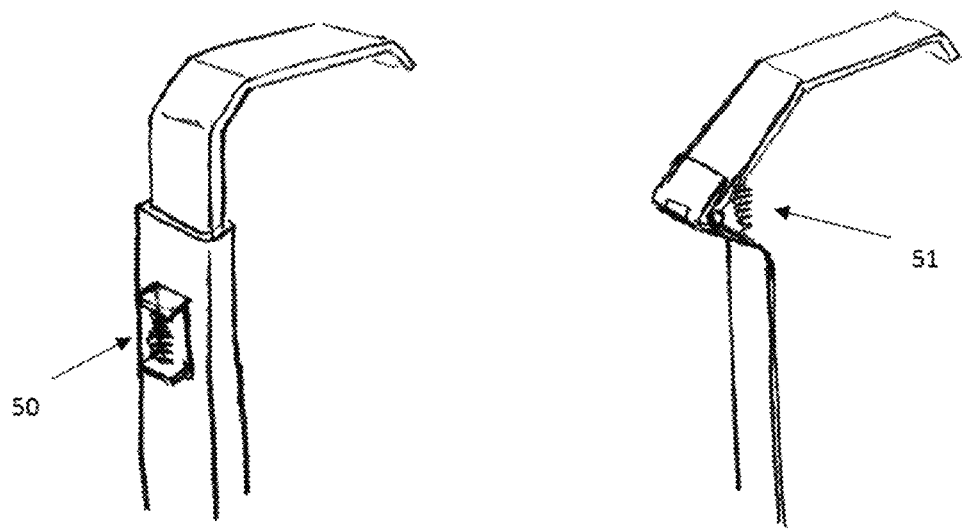
FIG. 10 shows alternative arrangements of spring elements in anti-slip components.

FIG. 10 shows two alternative embodiments of arrangements of spring elements in anti-slip components. Multiple springs (50, 51) at the extremities of arms 3 acting to pretension sleeves 10 and thus force anti-slip elements 2 inwards. A further embodiment utilises springs located internally within the arms 3. Such an embodiment is described in FIG. 9.

The invention claimed is:

1. An anti-skid device for enhancing traction on slippery roads comprising:
   at least 3 arms protruding radially from a backplate configured to rest against a wheel hub,
   each of the arms terminates in an associated anti-slip elements configured to be arranged on a tread surface of the tire,
   each of the arms is movably mounted to the backplate to allow extension or contraction of each of the arms in relation to the backplate,
   each of the arms has an elongated hole and rack teeth along one side of the elongated hole, a pinion is located centrally on the backplate, the pinion having teeth that engage the rack teeth of each of the arms, when the pinion is rotated in a first direction the arms are extended and the pinion is rotated in a second direction the arms are retracted,
   each of the anti-slip elements is equipped with a shoulder arranged to grip behind the tire,
   a lock for preventing extension of the arms when the lock is engaged, and
   wherein each of the arms is equipped with a compressive joint allowing the inwards displacement of the anti-slip elements to follow a displacement of the tire without in turn displacing the backplate.

2. The anti-skid device according to claim 1, wherein said device includes an inwardly biased spring element whereby each of the anti-slip elements maintain positive inwards pressure on the tire.

3. The anti-skid device according to claim 2, wherein the backplate is equipped with the spring element.

4. The anti-skid device according to claim 2, wherein each of the arms are equipped with an associated spring element.

5. The anti-skid device according to claim 2, wherein each of the anti-slip elements is equipped with the inwardly biased spring element.

6. The anti-skid device according to claim 1, wherein a handle is rotatably connected to the backplate and is connected to the arms such that reciprocating movement of the handle is translated into linear movement of the arms.

7. The anti-skid device according to claim 1, wherein a handle is rotatably connected to the backplate and is connected to the arms by gears such that rotational movement of the handle is translated into linear movement of the arms.

8. The anti-skid device according to claim 1, wherein the arms can be fitted to a range of tire diameters by adjusting the lengths of the arms.

9. The anti-skid device according to claim 1, wherein the anti-slip elements are hingeably attached to the arms and collapse for storage.

10. The anti-skid device according to claim 1, wherein the anti-slip elements are detachable from the arms for storage.

11. The anti-skid device according to claim 1, wherein a handle is connected to the pinion.

* * * * *